United States Patent [19]

Duis

[11] 4,400,656
[45] Aug. 23, 1983

[54] LIFTING DEVICE FOR DRIVING A LOAD

[75] Inventor: Arnoldus T. H. Duis, Bladel, Netherlands

[73] Assignee: Eldurail Industrie en Handelsonderneming B.V., Bladel, Netherlands

[21] Appl. No.: 214,980

[22] Filed: Dec. 10, 1980

[30] Foreign Application Priority Data

Dec. 22, 1979 [NL] Netherlands ............... 7909300

[51] Int. Cl.³ ............................................. H02P 5/40
[52] U.S. Cl. .................................... 318/798; 318/806; 318/811; 363/138
[58] Field of Search ................ 318/801, 803, 807–811; 363/138, 135, 136; 318/806, 798

[56] References Cited

U.S. PATENT DOCUMENTS

| | | | |
|---|---|---|---|
| 3,391,328 | 7/1968 | Mokrytzki | 363/135 |
| 3,512,067 | 5/1970 | Landay | 318/803 |
| 3,585,488 | 6/1971 | Gutt et al. | 308/811 |
| 3,820,003 | 6/1974 | Tappeimer et al | 318/811 |
| 3,980,941 | 9/1976 | Griebel | 363/138 |
| 4,060,757 | 7/1977 | McMurray | |
| 4,191,994 | 3/1980 | Kratz et al. | 363/138 |

FOREIGN PATENT DOCUMENTS 80201166.8 10/1982 European Pat. Off. .

OTHER PUBLICATIONS

Murphy, J.M.D. *Thyristor Control of A.C. Motors*, Pergamon Press, 1973, pp. 135–136.
Springer Verlag Wien, New York, F. Zach, "Leistungselektronik".

Primary Examiner—David Smith, Jr.
Attorney, Agent, or Firm—Oblon, Fisher, Spivak, McClelland & Maier

[57] ABSTRACT

A commutating device for driving a load wherein a main supply voltage is converted into positive and negative buffer voltages which are converted into a control voltage for application to at least one load and wherein the frequency of the control voltage is controlled by means of commutation of the buffer voltages by means of a main thyristor and a commutation circuit including an auxiliary thyristor provided for each of the positive and negative buffer voltages. At least one additional commutation circuit including an auxiliary thyristor, and typically plural additional commutation circuits, are connected in parallel to the firstly noted commutation circuit with the conduction periods of the several commutation circuits being determined on the basis of the polarity and level of the current to the load.

13 Claims, 4 Drawing Figures

LIFTING DEVICE FOR DRIVING A LOAD

BACKGROUND OF THE INVENTION

1. Field of the Invention

This invention relates to a device of the type including a converter for converting a main supply voltage into a positive and a negative buffer voltage, an inverter for converting the buffer voltages into a control-voltage to be supplied to at least one load connected to the device, for example, an electric motor, and a control-device for controlling the frequency of the control-voltage, wherein the inverter includes for both the positive and the negative buffer voltages a main thyristor energizable by the control-device as well as a commutation circuit for each of the main thyristors energizable by the control-device.

2. Description of the Prior Art

In a known device of the above-noted type, an auxiliary thyristor of the corresponding commutation circuit has to be triggered for switching off a main thyristor, as a result of which an oscillating current generated by reactive circuit elements starts flowing through the commutation circuit. In the first phase of the oscillating current the auxiliary thyristor is switched off, whereas in the subsequent phase of the oscillating current the current flowing through the main thyristor decreases and hence the main thyristor switches off, since the increasing current is conducted away by means of the commutation circuit. Since the current to be conducted away may assume high values, the reactive components of the commutation circuit should be proportioned accordingly, which is disadvantageous in many respects because in the first place the bulk of the reactive components is larger, for example, with regard to the coil included in the commutation circuit and secondly higher losses are involved, which results in the generation of more heat. A further detriment resulting from such disadvantages resides in that due to the generation of heat, for example, in the coil, the characteristics of this coil are adversely affected so that under given conditions a kind of avalanche effect may occur, as a result of which the entire commutation circuit becomes inoperative.

A further disadvantage is that thyristors having to pass a high current have a comparatively long response time. This is particularly important for the switching behavior of the auxiliary thyristor in the commutation circuit.

SUMMARY OF THE INVENTION

Accordingly, one object of this invention is to provide a novel device of the above-noted type which obviates at least one of the aforesaid disadvantages, and which is characterized by at least one further commutation circuit including an auxiliary thyristor energizable by the control-device and connected in parallel to the individual commutation circuit.

In a preferred embodiment of the device according to the invention each single commutation circuit, that is to say, that associated with the positive buffer voltage and that associated with the negative buffer voltage is replaced by a plurality of topologically identical commutation circuits.

One advantage of the invention is that the current to be conducted away is divided among various commutation circuits so that each individual commutation circuit need conduct away a low current so that the reactive components and the auxiliary thyristor of each commutation circuit can be correspondingly proportioned for lower current values, as a result of which all disadvantages mentioned above are obviated. The control-device of the device according to the invention ensures the energization of the main thyristors as well as of all auxiliary thyristors. The higher the number of auxiliary thyristors, the more useful it is to consider whether it is necessary at any time to use all auxiliary thyristors in order to achieve energy saving by the energization of the auxiliary thryistors by the control-device.

A further advantageous embodiment of the device according to the invention includes, in addition, a polarity detection member connected to the inverter for producing a polarity detection signal, which is representative of the polarity of the current flowing from the inverter to at least one load connected thereto, a control-member which, responding to the polarity detection signal, controls the control-device in a manner such that in turn it energizes only those commutation circuits which are correlated to the detected polarity. Thus, in the case of a positive motor current for example, no commutation circuits related to the negative buffer voltage are energized.

In a further advantageous embodiment, the device of the invention further includes a level detection member connected to the inverter for producing a level detection signal, which is representative of the level of the current flowing from the inverter to at least one load connected thereto, a comparator for comparing the level detection signal to one of a plurality of discrete reference levels corresponding to the total number of commutation circuits in order to control, in response to the result of the comparison, the control-device in a manner such that only that number of commutation circuits in energized that is required with respect to the detected current level.

The level detection of the motor current permits a determination of the number of auxiliary thyristors required to withstand the current to be conducted away so that invariably the minimum number of auxiliary thyristors can be employed.

A further advantageous embodiment of the device according to the invention is characterized in that between the comparator and the control-device there is connected a selection member for selecting on the basis of the number of commutation circuits to be energized among the overall number of potential commutation circuits that one so that the auxiliary thyristor of each commutation circuit is, at an average, operative for the same period of time or that the auxiliary thyristor of each commucation circuit is, at an average, energized substantially the same number of times. By this step the number of auxiliary thyristors to be used is employed by turns.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Figure 1:
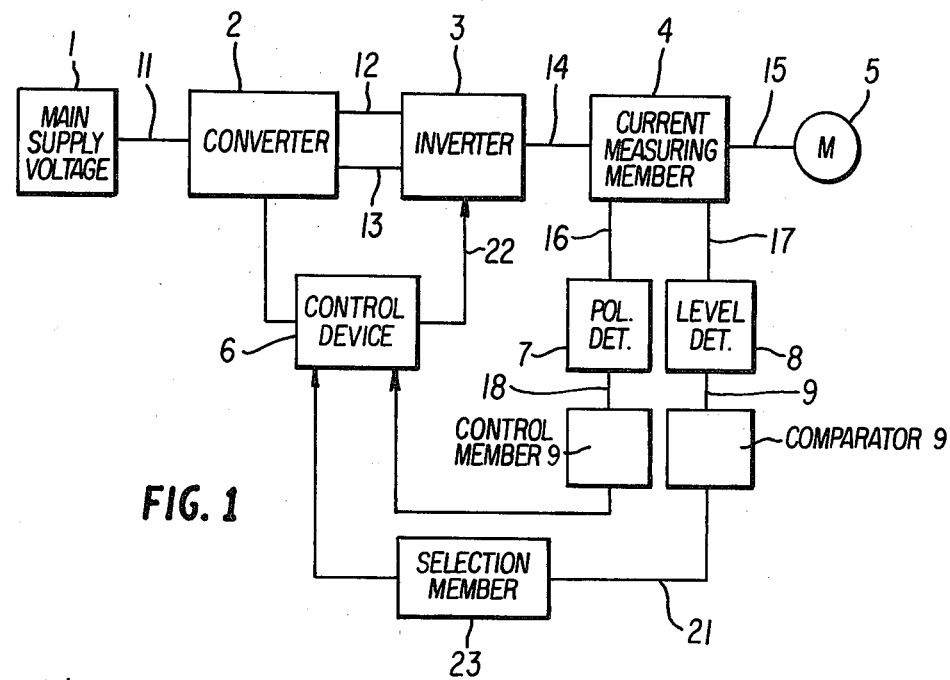
FIG. 1 is a block diagram of a preferred embodiment of the device in accordance with the invention.

Referring now to the drawings, wherein like reference numerals designate identical or corresponding parts throughout the several views, and more particularly to FIG. 1 thereof, the reference numeral 1 designates the main supply voltage. It may be a three-phase main supply voltage, but this is not necessary. Through the lead 11 the phases R, S and T can be applied to the converter indicated by reference numeral 2. The converter 2 serves to rectify the main supply voltage and to stabilize the same so that a positive buffer voltage is applied to lead 12 and a negative buffer voltage to lead 13. If a 380 V main supply voltage is used, the amplitude of both the positive and negative buffer voltage will be 540 V. At the leads 12 and 13 an inverter is indicated by reference numeral 3. The inverter 3 serves to convert the positive and the negative buffer voltages into voltages which are applied through the lead 14 to a motor 5 in order to control the speed of rotation of the rotor of the motor 5. The voltage applied to the motor 5 through the lead 14 may also be a three-phase alternating voltage (U, V, W). It should be noted that the preferred embodiment of the device according to the invention is described as being used on an electric motor, but the range of use of the invention is not limited thereto, since any load may be connected to the device with the desired result.

Figure 3:
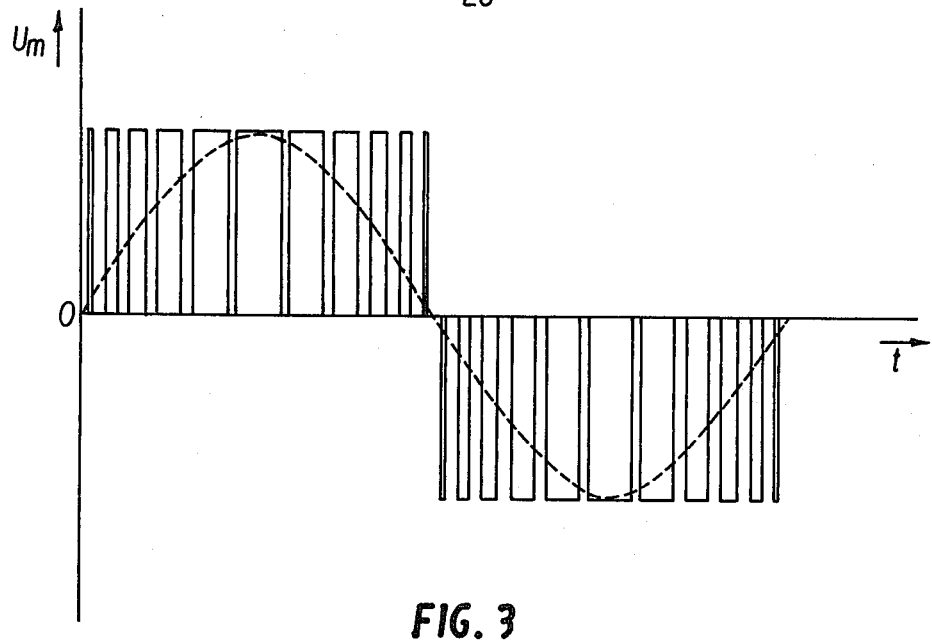
FIG. 3 is a graph of the pulse voltage to be applied to an electric motor by the device according to the invention, and of the sinusoidal mean value thereof.

A control-device designated by reference numeral 6 controls the inverter 3 and hence the voltage to be applied to the motor. The voltage $U_m$ applied to the motor 5 may be formed by a periodic pulse sequence, the mean value of which is sinusoidal as is indicated in FIG. 3 of the drawing, though this is not necessary in this invention. The speed of rotation of the rotor of the electric motor 5 is obtained by controlling the frequency of the voltage to be applied to the electric motor 5. The control-device 6 controls via lead 22 the inverter 3 in a manner such that the frequency control is performed by means of pulse width modulation. In FIG. 3 the mean value of the periodic pulse sequence is indicated by a broken line; it has a sinusoidal shape. When the control-device 6 controls the inverter 3 through lead 22 to an extent such that the width of the individual pulses of the sequence decreases, the frequency of the mean voltage increases so that the rotor of the electric motor increases its speed. It should be noted that the control-device may be externally controlled manually or automatically.

Between the inverter 3 and the electric motor 5—it being noted that a plurality of motors may be used—is connected a current measuring member 4, which passes through lead 15 the output voltage of the inverter 3 to the electric motor 5. Preferably the current measuring member 4 is a Hall element disposed in the magnetic field produced by the motor current.

Through the leads 16 and 17 the current measuring member 4 produces a signal which is representative of the motor current. A polarity detection member 7 provides through lead 18 a signal which is indicative of the polarity of the motor current, whilst through lead 19 a current level detection member 8 provides a signal which is indicative of the level or the amplitude of the motor current.

The use of the polarity signal through lead 18 and of the level signal through lead 19 will be explained more fully hereinafter subsequent to the description of the implementation of an inverter 3 in accordance with the invention.

Figure 2:
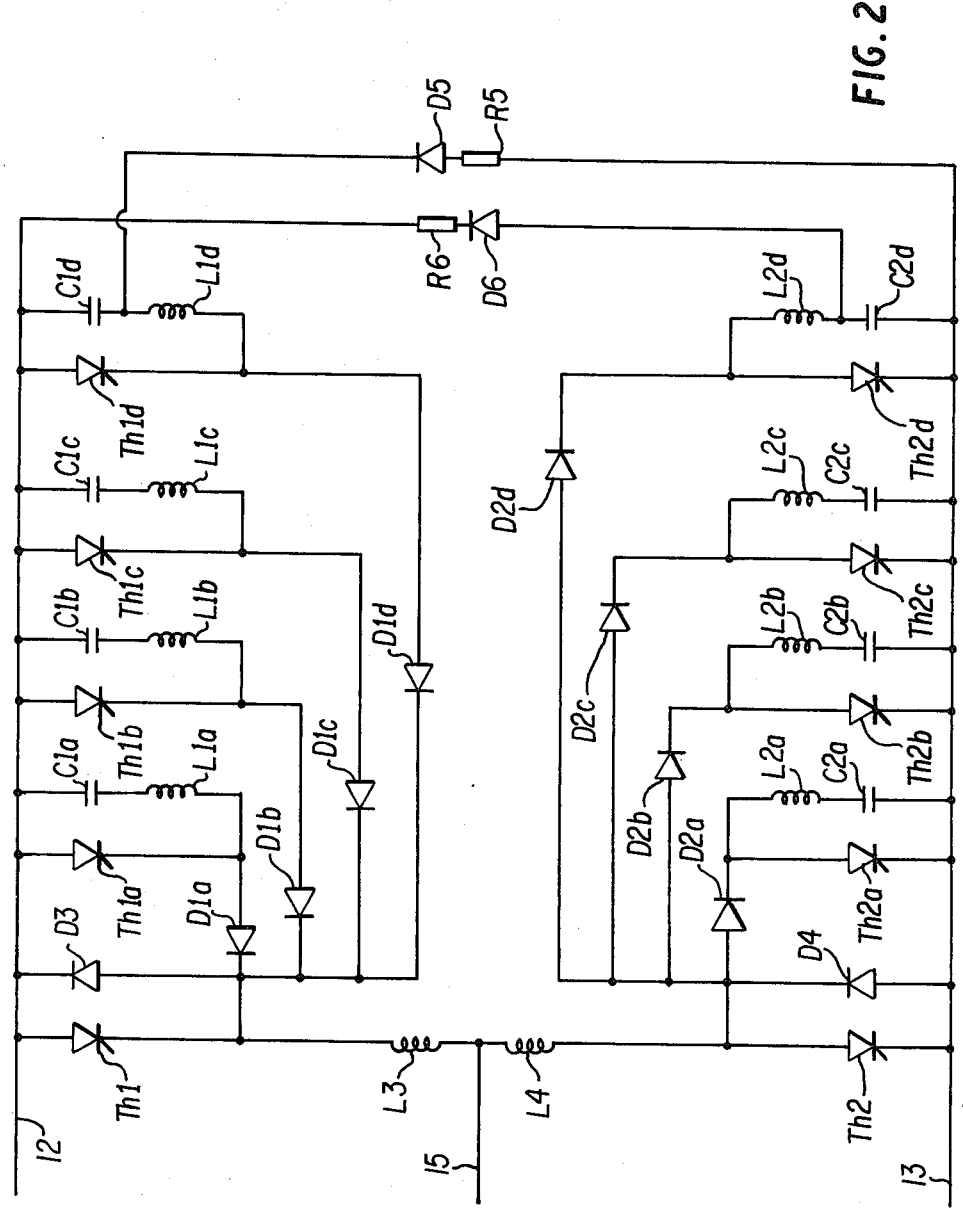
FIG. 2 is a highly simplified circuit diagram of the inverter of the block diagram of FIG. 1.

FIG. 2 of the drawing shows a highly simplified circuit diagram of the inverter 3 in the block diagram of FIG. 1. Herein only those components which are required for a good understanding of the operation of the inverter according to the invention are shown.

Reference numerals 12 and 13 designate the leads carrying the positive and the negative buffer voltages respectively of, for example, +540 V and −540 V. Reference numeral 15 designates the lead passing the voltage to be applied to the motor 5. Reference symbols Th1 and Th2 designate the main thyristors for the positive and the negative buffer voltages respectively. Reference symbols Th1a . . . Th1d and the reference symbols Th2a . . . Th2d designate the auxiliary thyristors associated with the main thyristor Th1 and the main thyristor Th2, respectively. To the main thyristors Th1 and Th2 are connected in parallel opposition the diodes D3 and D4 respectively, in order to regeneratively feed the converter by the motor connected to the inverter during braking of the motor. Each auxiliary thyristor is connected in a corresponding commutation circuit. Since all commutation circuits are topologically identical, one given commutation circuit will be described i.e., that provided by the prior art.

The auxiliary thyristor Th1a is connected by its anode to the anode of the main thyristor Th1, whereas the cathode of the auxiliary thyristor Th1a is connected by means of a diode D1a connected in the forward direction to the cathode of the main thyristor Th1 as is indicated in FIG. 2. To the auxiliary thyristor Th1a is connected in parallel a series resonance circuit comprising a capacitor C1a and a coil L1a, with the junction of the series combination being connected through a blocking network (not shown in FIG. 2) to the negative buffer voltage. The blocking network is very simply indicated with respect to the resonance circuit C1d, L1d associated with auxiliary thyristor Th1d through diode D5 and resistor R5.

According to the prior art each main thyristor is equipped with only one commutation circuit, which involves the disadvantages mentioned in the preamble, that is to say, bulky reactive elements such as the capacitor C1a (which may in practice be formed by a plurality of parallel-connected capacitors) and coil L1a, so that the inverter according to the prior art occupies much space, which results in considerable loss and an increase in temperature of the reactive elements, which in turn give rise to avalanche effects and to a final break-down of the inverter. The auxiliary thyristor thus necessarily has a long response time of the order of magnitude of 50 $\mu$sec. ($T_q$).

However, according to the invention the individual commutation circuit has connected to it in parallel at least one further commutation circuit so that the current to be conducted away by the original commutation circuit proportionally decreases and the reactive components can be proportioned for a lower current strength and, however, a lower current proportioning value can be chosen for each auxiliary thyristor, as a result of which an auxiliary thyristor of shorter response time can be used, the aforesaid disadvantages being thus eliminated.

In the embodiment shown in FIG. 2 each main commutation circuit Th1a, D1a, C1a and L1a and Th2a, D2a, L2a and C2a respectively is provided with three parallel-connected auxiliary commutation circuits Th1b, D1b, C1b, L1b; Th1c, D1c, C1c, L1c; Th1d, D1d, C1d, L1d; and Th2b, D2b, L2b, C2b; Th2c, D2c, L2c, C2c; Th2d, D2d, L2d, C2d, respectively, which has the advantage that the auxiliary thyristors as well as the associated capacitors and coils can be proportioned for a four times lower current so that the bulk of the reactive components approximately diminishes by a factor 16 ($4^2$), whilst the response time of the auxiliary thyristors to be used is definitely shorter by one order of magnitude.

FIG. 2 shows a last auxiliary commutation circuit with respect to the main thyristor Th2 as well as the junction of the series combination associated with this main thyristor by means of a pass network connected to the positive buffer voltage as is schematically indicated by diode D6 and resistor R6.

Finally FIG. 2 of the drawing shows the coils L3 and L4, it being noted that the cathodes of the main thyristors Th1 and Th2 may be connected by means of a complicated impedance circuit to the supply lead 15 for the application of the control-voltage to the electric motor.

Referring again to FIG. 1, those blocks of the block diagram which relate to the use of the signal on lead 16 and the use of the signal on lead 17 of the block diagram of FIG. 1 will now be discussed.

Referring to FIG. 1, reference numeral 7 designates a polarity detection member for generating a signal representative of the polarity of the motor current. The member 7 is connected through lead 18 to a control-member 9 for controlling through lead 20 the control-device in a manner such that the latter, in turn, energizes only those commutation circuits which are correlated with the detected motor current polarity. When the polarity of the motor current detected by the polarity 7 is positive, no commutation circuits associated with the negative buffer voltage are energized. Therefore, in the case of a positive motor current only the thyristors Th1a ... Th1d are energized by the control-device 6, whereas the auxiliary thyristors Th2a ... Th2d are not energized, which yields a 50% saving. It should be noted that by providing auxiliary commutation circuits including the auxiliary thyristors Th1b ... Th1d and Th2b ... Th2d it is more useful to consider the energization of the auxiliary thyristors of the auxiliary commutation circuits, the more so as the number of auxiliary commutation circuits increases. By sophisticated use and corresponding implementation energy can be saved apart from the use of auxiliary commutation circuits resulting in the advantages described above.

Figure 4:
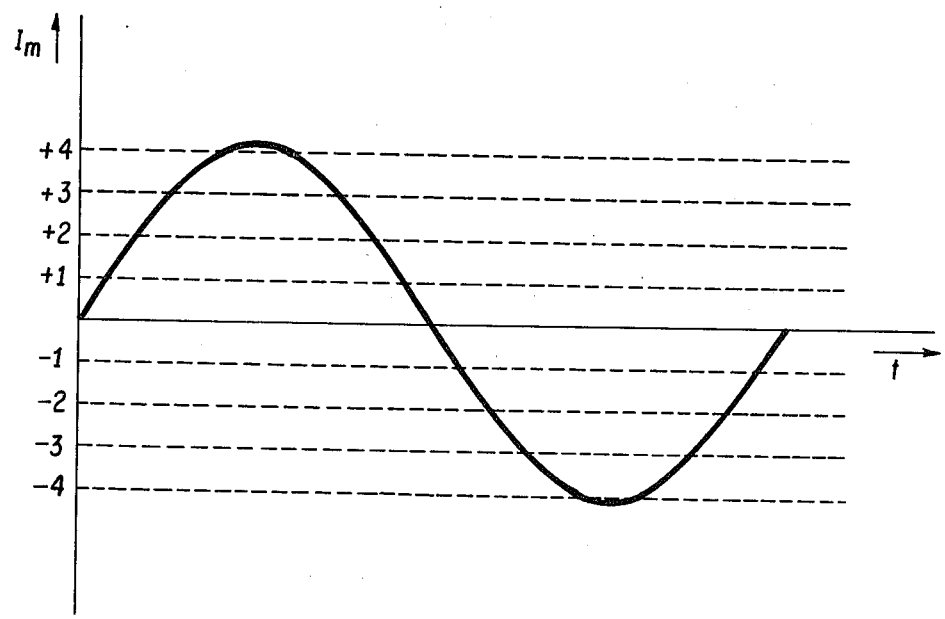
FIG. 4 is a schematic diagram illustrating the discrete comparison levels for comparison with the motor current.

The signal on lead 17 emanating from the current measuring member 4 is applied to a level detector 8 for providing a current level detection signal on lead 19, through which said signal is applied to a comparator 10, in which the level detection signal of lead 19 is compared to a plurality of discrete levels corresponding to the number of auxiliary thyristors. FIG. 4 of the drawing illustrates how the analog level of the motor current $I_m$ is divided into eight discrete levels i.e., four positive levels associated with the commutation circuits of the main thyristor associated with the positive buffer voltage and four negative levels associated with the auxiliary thyristors of the main thyristor associated with the negative buffer voltage. the output signal of the comparator circuit 10 is applied through lead 21 to the control-device to control the same, in turn, in a manner such that only that number of commutation circuits is energized which is necessary with regard to the detected current level. If, for example, the positive motor current level lies between +1 and +2 for example only two auxiliary thyristors of the sequence of Th1a ... Th1d are energized by the control-device 6 owing to the control of the control-device 6 by the control-member 9 and the comparator 10, whereas none of the auxiliary thyristors Th2a ... Th2d is energized.

If the motor current level is lying between the level −1 and the level +1, the control-device 6 energizes a main thyristor of the sequence of Th1a ... Th1d as well as an auxiliary thyristor of the sequence of Th2a ... Th2d. The inverter 3 of FIG. 4 comprises in total for each buffer voltage five auxiliary thyristors.

Referring to FIG. 1, a selection member 23 is connected between the comparator 10 and the control-device 6 for the reception of the discrete level detection signal via lead 21 from comparator 10. Under the action of this discrete level detection signal indicating the number of auxiliary thyristors to be energized the selection member controls the control-device 6 through lead 22 in a manner such that the auxiliary thyristors to be used operate in rotation. The selection by the selecting member 23 may be performed in various ways, for example, by selecting the auxiliary thyristor of each commutation circuit in a manner such that it is on average operative for the same period of time or that the auxiliary thyristor of each commutation circuit is, substantially on average, energized as many times.

The control-device 6 is a logic circuit which may be formed by discrete elements, integrated circuits and so forth. If the number of auxiliary thyristors is high, for example, ten, it is preferred to include in the control-device a programmable memory in order to perform the control of the energization of main and auxiliary thyristors in the inverter 3 in dependence upon the detected polarity and the level of the motor current in a manner such tht optimum saving of energy is obtained.

If a plurality of parallel commutation circuits are used for each buffer voltage in an inverter, further advantages can be ensured in accordance with the invention by differently proportioning the sequence of resonance circuits of the various commutation circuits to an extent such that subsequent to energization of the corresponding auxiliary thyristors the auxiliary thyristors will not simultaneously switch off in the second phase of the oscillating voltage. The auxiliary thyristor first switching off after the energization by the control-device 6 is then cut off by an oscillating signal of comparatively high frequency, whereas the auxiliary thyristor energized at the same instant and switching off at a later instant is cut off by means of an oscillating signal of comparatively low frequency. By the superimposition of the second phases of the oscillating voltages of different frequencies appearing at different instants it is possible to obtain such a waveshape of the leaving current that this waveshape has comparatively low peaks so that the cut-off time $T_9$ of the main thyristor can be chosen with the largest possible amplitude, as a result of which losses are lower and the same advantages as described above are obtained. Recapitulating, the auxiliary thyristors to be energized at the same instant, but by differently proportioning the coils and capacitors in the associated commutation circuits the second phases of the associated oscillating voltages occur later so that the basis of the halfwave in time is broader, and by superimposition resulting from the parallel connection of the commutation circuits, the resultant halfwave is formed so that it has comparatively low peaks and in the ideal case half a square wave.

A further possibility of obtaining an ideal halfwave resides in that the thyristors are energized by the control-device 6 at relatively shifted instants and the amplitudes of the various halfwaves to be superimposed are differently chosen to an extent such that again an ideal halfwave is obtained.

Obviously, numerous modifications and variations of the present invention are possible in light of the above teachings. It is therefore to be understood that within the scope of the appended claims, the invention maybe practiced otherwise than as specifically described herein.

What is claimed as new and desired to be secured by Letters Patent of the United States is:

1. A device for driving a load, comprising:
    a converter for converting a main supply voltage into positive and negative buffer voltages;
    an inverter for converting the buffer voltages into a control-voltage for application to at least one load connected to the device;
    a control-device for controlling the frequency of said control-voltage;
    said inverter comprising a main thyristor for the positive buffer voltage and a main thyristor for the negative buffer voltage, energizable by said control-device and a commutation circuit including an auxiliary thyristor energizable by the control-device for each of the main thyristors;
    wherein each of the individual commutation circuits are connected in parallel to at least one further commutation circuit including a further auxiliary thyristor energizable by said control-device; and
    detection and selection means having an input coupled to the inverter and an output coupled to the control-device for detecting the level of a load current flowing from the inverter to said load and for controlling said control device in accordance with the detected load current such that only such a number of commutation circuits is energized as is necessary in regard of the detected load current level.

2. A device as claimed in claim 1, further comprising:
    said further commutation circuits being topologically identical to the individual commutation circuits.

3. A device as claimed in claims 1 or 2, further comprising:
    a polarity detection member connected to the inverter for producing a polarity detection signal, which is representative of the polarity of the current flowing from the inverter to said load connected thereto; and
    a control member coupled between said polarity detector and said control-device for controlling said control-device in response to the polarity detection signal in a manner such that the latter, in turn, energizes only those commutation circuits which correspond to the detected polarity.

4. A device as claimed in claims 1 or 2, wherein said detection and selection means comprises:
    a level detection member coupled to the inverter for generating a level detection signal which is representative of the level of the current flowing from the inverter to said load connected thereto; and
    a comparator for comparing the level detection signal to a number of discrete reference levels corresponding with the total number of commutation circuits of each main thyristor in order to control the control-device based on the comparison result in a manner such that only such a number of commutation circuits is energized as is necessary in regard of the detected current level.

5. A device as claimed in claim 3, wherein said detection and selection means comprises:
    a level detection member coupled to the inverter for generating a level detection signal which is representative of the level of the current flowing from the inverter to said load connected thereto; and
    a comparator for comparing the level detection signal to a number of discrete reference levels corresponding with the total number of commutation circuits of each main thyristor in order to control the control-device based on the comparison result in a manner such that only such a number of commutation circuits is energized as is necessary in regard of the detected current level.

6. A device as claimed in claim 3 wherein said polarity detection member comprises:
    a Hall-effect transducer arranged in the magnetic field produced by the current flowing from the inverter to said load connected thereto.

7. A device as claimed in claim 4 wherein said level detection member comprises:
    a Hall-effect transducer arranged in the magnetic field produced by the current flowing from the inverter to said load connected thereto.

8. A device as claimed in claim 5 wherein said level detection member comprises:
    a Hall-effect transducer arranged in the magnetic field produced by the current flowing from the inverter to said load connected thereto.

9. A device as claimed in claim 4, wherein said detection and selection means comprises:
    a selection member connected between the comparator and the control-device for selecting the cummutation circuits to be energized on the basis of the number of commutation circuits to be energized such that on an average the auxiliary thyristor of each commutation circuit is operative substantially for the same period of time.

10. A device as claimed in claim 4, wherein said detection and selection means comprises:
    a selection member connected between the comparator and the control-device for selecting the commutation circuits to be energized on the basis of the number of commutation circuits to be energized such that the auxiliary thyristor of each commutation circuit is, on an average, energized substantially as many times.

11. A device as claimed in claim 1, wherein the control-device comprises:
    a programmable memory.

12. A device as claimed in claim 1, further comprising:
    said control-device energizing the auxiliary thyristors at the same instant; and
    each commutation circuit connected in parallel to the auxiliary thyristor including a resonance circuit, wherein the resonance circuits of the individual commutation circuits are relatively differently proportioned so that the second phase of the current waveshape obtained by superimposition of the oscillating currents produced by the resonance circuits subsequent to energizaiton of the auxiliary thyristors assumes an ideal form substantially without peaks.

13. A device as claimed in claim 1, further comprising:

the auxiliary thyristors being energized by an auxiliary thyristor connected in parallel thereto, and
each commutation circuit including a resonance circuit which is differently proportioned for each respective commutation circuit such that the amplitude of the second phase of the current of a subsequently energized auxiliary thyristor produced by the associated oscillating circuit exceeds that of an auxiliary thyristor energized earlier by the control-device.

* * * * *